(12) United States Patent
Gerardo

(10) Patent No.: US 11,102,964 B1
(45) Date of Patent: Aug. 31, 2021

(54) ELECTRONIC FISHING LURE

(71) Applicant: Martin Gerardo, Saylorsburg, PA (US)

(72) Inventor: Martin Gerardo, Saylorsburg, PA (US)

( * ) Notice: Subject to any disclaimer, the term of this patent is extended or adjusted under 35 U.S.C. 154(b) by 0 days.

(21) Appl. No.: 15/963,347

(22) Filed: Apr. 26, 2018

(51) Int. Cl.
*A01K 85/01* (2006.01)

(52) U.S. Cl.
CPC .................................. *A01K 85/01* (2013.01)

(58) Field of Classification Search
CPC ....... A01K 85/00; A01K 85/005; A01K 85/01
USPC .................. 43/42.31, 26.2, 26.1, 17.1, 42.06
See application file for complete search history.

(56) References Cited

U.S. PATENT DOCUMENTS

| | | | | |
|---|---|---|---|---|
| 4,625,447 A * | 12/1986 | Buchanan | ............... | A01K 85/01 43/17.1 |
| 4,787,167 A * | 11/1988 | Wroclawski | ........... | A01K 85/01 43/17.6 |
| 6,789,347 B1 * | 9/2004 | West | ...................... | A01K 85/01 43/17.1 |
| 6,807,766 B1 | 10/2004 | Hughes | | |
| 7,562,489 B2 | 7/2009 | Turner | | |
| 9,770,015 B2 | 9/2017 | Slocum | | |
| 2004/0200125 A1 | 10/2004 | Albanito | | |
| 2005/0138857 A1 | 6/2005 | Markley | | |
| 2006/0010763 A1 | 1/2006 | Podlewski | | |
| 2008/0000140 A1 | 1/2008 | Mitchell | | |
| 2008/0271358 A1 | 11/2008 | Meroney | | |
| 2013/0067791 A1 * | 3/2013 | Gao | ........................ | A01K 85/01 43/17.6 |
| 2013/0067792 A1 * | 3/2013 | Thomas | ................. | A01K 85/01 43/26.2 |
| 2013/0145673 A1 * | 6/2013 | Babcock, III | .......... | A01K 85/00 43/42.06 |
| 2013/0227874 A1 * | 9/2013 | Dugan | ................... | A01K 85/00 43/26.2 |
| 2015/0101235 A1 | 4/2015 | Ogawa | | |
| 2015/0128474 A1 * | 5/2015 | James | ..................... | A01K 85/01 43/17.6 |
| 2015/0150226 A1 | 6/2015 | Mcleod | | |
| 2015/0208625 A1 * | 7/2015 | Mann | ...................... | A01K 85/01 43/17.6 |
| 2016/0007581 A1 * | 1/2016 | Davidson | ............... | A01K 85/02 43/17.1 |
| 2018/0045400 A1 * | 2/2018 | Bushee | ................... | A01K 85/01 |
| 2018/0235197 A1 * | 8/2018 | Portrat | ................... | A01K 85/01 |

FOREIGN PATENT DOCUMENTS

DE  102008019315 A1 * 10/2009 ............. A01K 85/01

* cited by examiner

*Primary Examiner* — Darren W Ark
*Assistant Examiner* — William L Gmoser
(74) *Attorney, Agent, or Firm* — Muskin and Farmer LLC

(57) ABSTRACT

An electronic fishing lure. The fishing lure has a solar powered motor which is housed inside an echo chamber inside the lure. The echo chamber is slightly larger in size than the motor so that the motor (when energized) would rattle around inside the echo chamber, causing the lure to shake in the water and make a rattling noise in the water. This ripple action of the lure mimics something alive in the water.

14 Claims, 7 Drawing Sheets

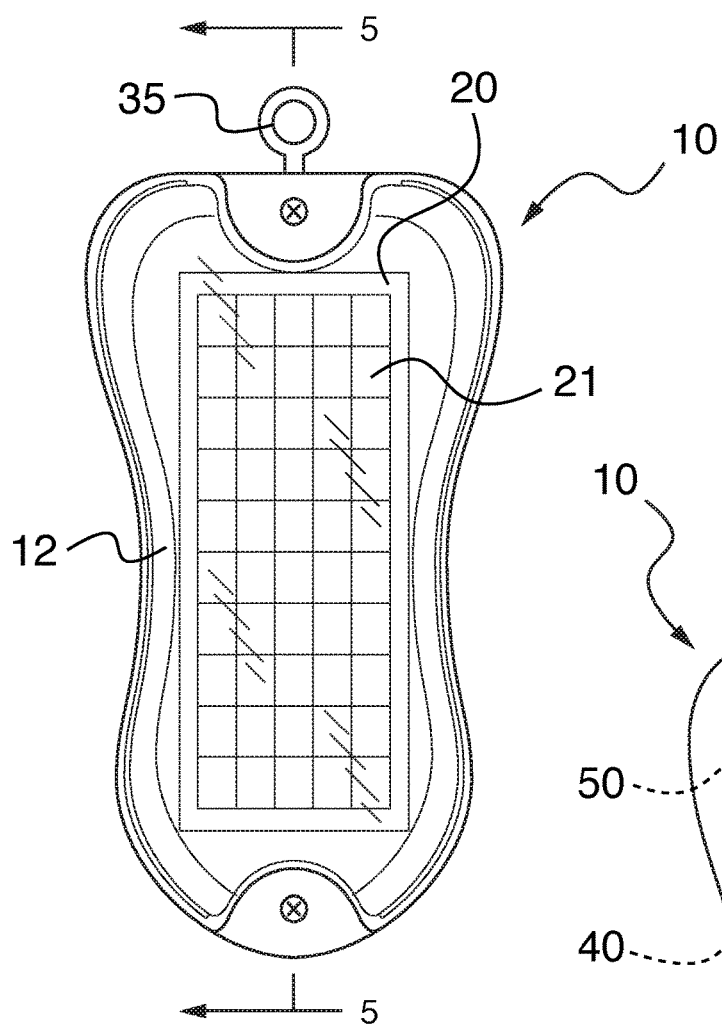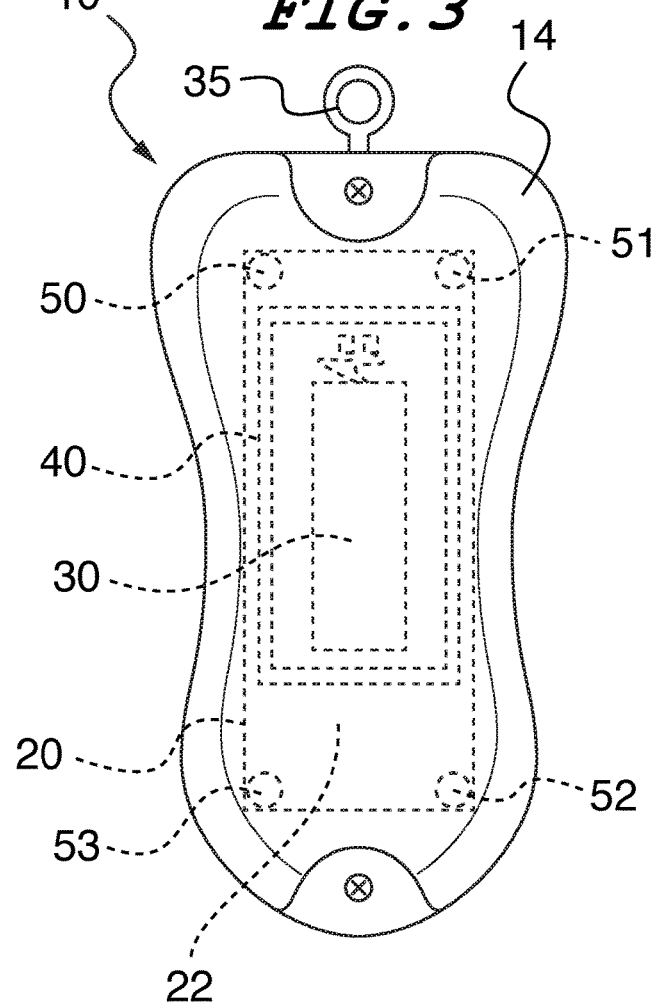

ELECTRONIC FISHING LURE

BACKGROUND OF THE INVENTION

Field of the Invention

The present general inventive concept is directed to a method and apparatus for an electronic fishing lure.

Description of the Related Art

Fishing lures are commonly used by fisherman in order to attract fish.

SUMMARY OF THE INVENTION

It is an aspect of the present invention to provide an improved fishing lure.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which:

FIG. 2 is a top view of the fishing lure, according to an embodiment;

FIG. 3 is a bottom view of the fishing lure, according to an embodiment;

DESCRIPTION OF THE PREFERRED EMBODIMENTS

Figure 1:
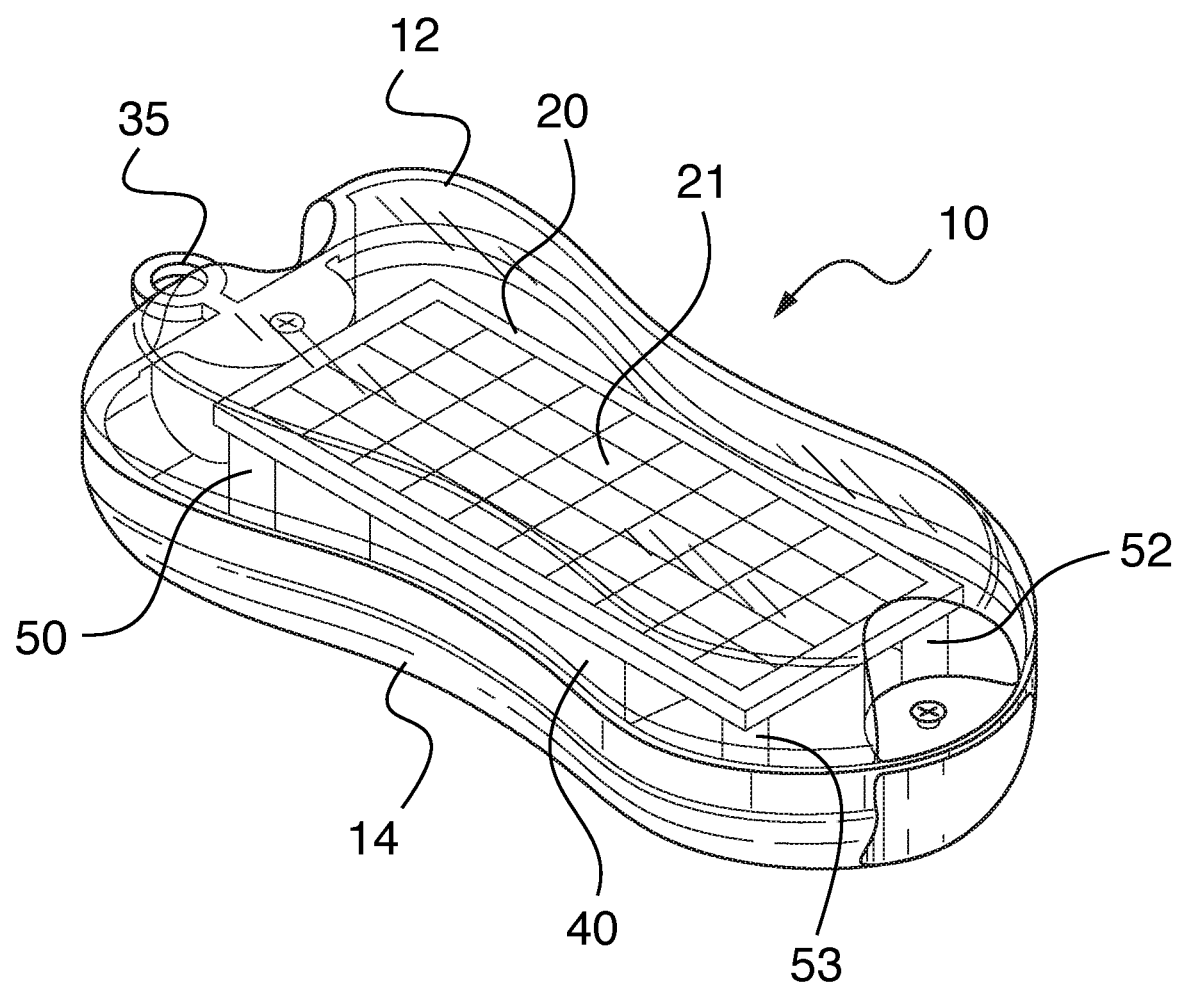
FIG. 1 is perspective view of a fishing lure, according to an embodiment.

Reference will now be made in detail to the presently preferred embodiments of the invention, examples of which are illustrated in the accompanying drawings, wherein like reference numerals refer to like elements throughout.

The general inventive concepts relates to an electronic fishing lure. The lure has a motor which is driven by a solar panel, thus not requiring a battery. The lure has an echo chamber on the bottom of the lure which the motor fits inside. The echo chamber is slightly larger than the motor, thereby (when the motor is operating) causing the motor to vibrate and shake inside the echo chamber. This vibration causes the lure itself to shake (vibrate) in the water, thereby emulating the motion of a live fish. The vibration (ripple action) of the lure in the water and the rattling sound attracts fish.

FIG. 1 is perspective view of a fishing lure, according to an embodiment.

A fishing lure 10 has a hollow casing with a top side 12. The top side 12 is transparent and will generally be the side that is face up when the lure 10 is floating in water. The casing of the fishing lure 10 also has a bottom side 14 which can be opaque. Structural pegs 50, 51, 52, 53 are present to provide support for the lure 10.

An echo chamber 40 has a hollow area (can be rectangular or any other shape) which is used to house the motor 30 (not shown in FIG. 1). The motor 30 vibrates inside the echo chamber 40 and is what causes the lure to shake (vibrate) in the water. A solar cell array 21 (solar panel) is electronically connected to the motor 30 and is what powers the motor 30 (without need for a battery or other power source). The solar cell array 21 is located under the top side 12 (which is transparent) and since it is facing up (towards the sky) would collect solar rays. The lure 10 is structured so that when placed in water it would naturally orient itself so that the top side 12 positions itself on top (and hence the bottom side 14 would position itself on the bottom). The solar cell array 21 is on top of a circuit board 20. The lure 10 would float not sink.

Note that when the top side 12 fits onto the bottom side 14 and can be screwed on tightly so that the lure 10 would be waterproof and hence water would not leak inside of the lure 10.

FIG. 2 is a top view of the fishing lure, according to an embodiment.

The solar cell array 21 should be unobstructed so that it would catch a maximum amount of solar rays. The top side 12 is transparent and ideally should be as light as possible as to not block out any solar energy from the sun.

FIG. 3 is a bottom view of the fishing lure, according to an embodiment.

Shown in the bottom view is the bottom side 14 and the structural pegs 50, 51, 52, 53. Also shown is the underside 22 of the circuit board circuit board 20 which houses the solar cell array 21. The vibrating motor 30 is inside the echo chamber 40. As described herein, the echo chamber 40 is larger in size than the motor 30 in order to enable the motor 30 to rattle around inside the echo chamber 40 causing a rattling sound audible to humans (both when the lure is active out of the water and when the lure is active in the water). The length, width and height of the motor are all smaller than the length, width, and height of the echo chamber 40 so that motor 30 is unrestrained inside the echo chamber 40.

Figure 4:
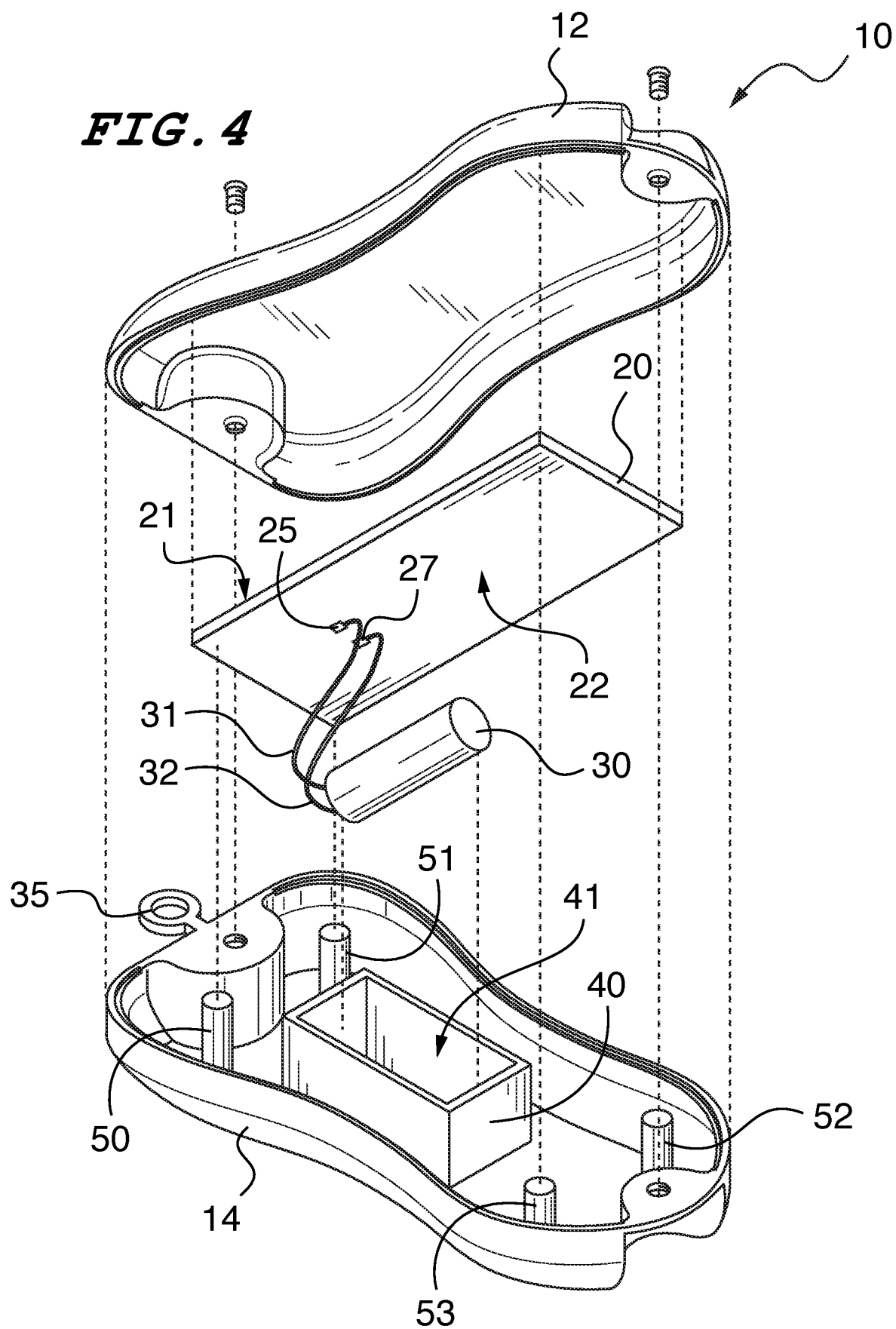
FIG. 4 is an exploded view of the fishing lure, according to an embodiment.

FIG. 4 is an exploded view of the fishing lure, according to an embodiment.

A positive wire 31 and a negative wire 32 connect the motor 30 to the circuit board 20 (and ultimately the solar cell array 21) via a positive electrical connection 25 and a negative electrical connection 27. The positive electrical connection 25 and the negative electrical connection 27 are both located on the underside 22 of the circuit board 20. The wires 31, 32 can be connected to the motor and the solar panel via solder (or any other known connection type).

Note that the echo chamber 40 has a hollow interior 41 and is slightly larger than the motor 30 so that the motor (when energized by the solar cell array 21) would shake and rattle inside the echo chamber 40. This shaking and rattling motion of the motor 30 inside the echo chamber 40 is what would cause the lure itself to shake in the water, causing ripples in the water (and hence attracting fish). The rattling sound of the motor rattling inside the echo chamber 40 can also be heard by fish in the water also attracting fish.

Note how the echo chamber 40 is underneath the circuit board 20. When the lure is completely assembled, everything fits into place and there would be no moving parts except for the active motor 30 shaking inside the interior 41 of the echo chamber 40. The motor 30 is not stationarily mounted inside the echo chamber 40 and hence would move around when energized. In other words, if the motor 30 were securely mounted (stationarily mounted) inside the echo chamber 40, then the motor 30 would not be able to move or bounce around inside the echo chamber, but this is not the case. It is important that the hollow interior 41 of the echo chamber 40 is larger than the size of the motor 30 so that the motor 30 would bounce around (not stationarily mounted) inside the echo chamber 40 when powered. The only physical attachment between the motor 30 and the lure 10 are the wires 31, 32 which are of ample length giving the motor 30 the ability to bounce around inside the echo chamber 40 as the motor 30 is not stationarily mounted inside the echo chamber 40 (and hence not stationarily mounted to the lure 10). The wires 30, 31 have excess length so the motor 30 can move around. The wires 30, 31 can be long enough so that they do not restrict the motion of the motor 30 in any direction or in any way (the restriction in movement of the motor 30 comes from the motor 30 hitting against the echo chamber 40). Besides the wires 30, 31, there is no other physical attachment to the motor 30 (meaning the motor 30 is unrestrained inside the echo chamber 40). There is nothing connected or attached to the motor 30 to secure the motor 30 in place. Hence, the motor is not "stationarily mounted." The bouncing around of the motor 30 inside the echo chamber 40 causes the rattling sound.

Figure 5:
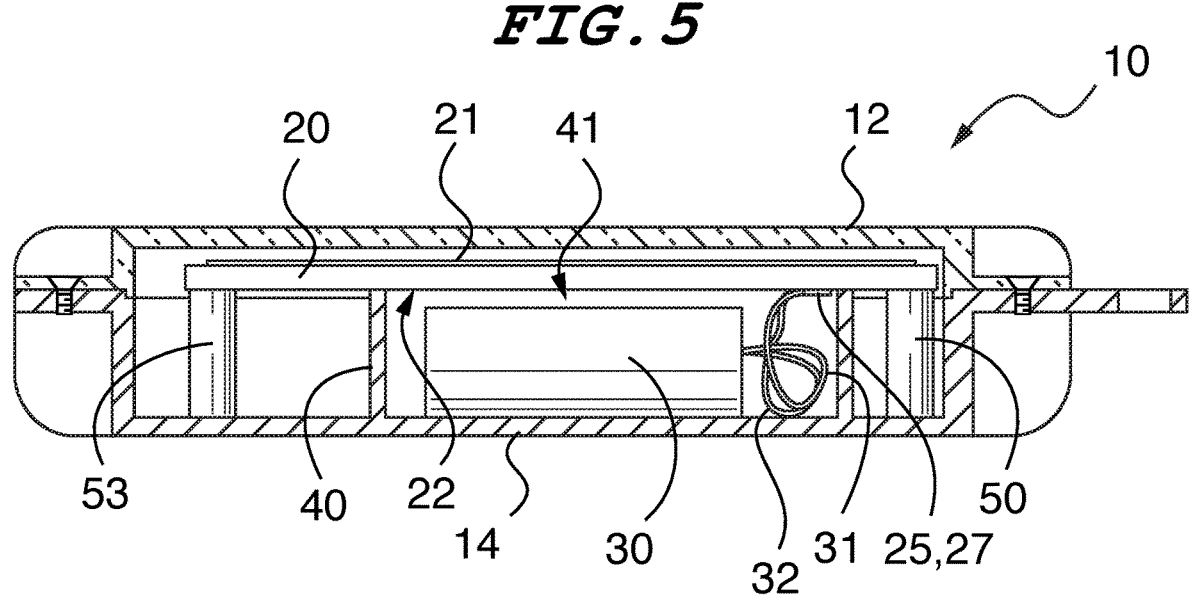
FIG. 5 is a cross sectional view from the view indicated in FIG. 2, according to an embodiment.

FIG. 5 is a cross sectional view from the view indicated in FIG. 2, according to an embodiment.

Note how the motor 30 is slightly smaller (in all three dimensions) than the interior 41 of the echo chamber 40 so that the motor 30 has room to rattle and shake around inside the echo chamber. The length, width, and height of the echo chamber 40 are all larger than the size of the motor 30. The wires 31, 32 have extra length thereby enabling the motor 30 to shake around the echo chamber 40. Thus, while the wires 31, 32 are attached to the motor 30 inside the hollow interior 41 inside the echo chamber 40, because the wires have excess length (e.g., at least 10 millimeters (or alternatively a different amount) causing the wires to "bunch up") the motor 30 is not stationarily mounted inside the echo chamber 40 as the motor can move and bounce around inside the echo chamber 40 because there is no force on the motor to keep it stationary (hence the motor is not "stationarily mounted.") The motor can move until it collides with the walls of the echo chamber 40 and then can bounce in another direction, etc. The motor (if in the center of the hollow interior 41) is free to move (and can move due to the energy of the motor) at least 1 millimeter (or alternatively a smaller distance) inside the echo chamber 40 in all directions (length, width, height). In other words, if the motor was centered inside the echo chamber (centered in height, width, and depth, in other words floating inside the echo chamber 40) then the motor would have at least 1 millimeter empty space to its left from its left side, at least 1 millimeter empty space to its right from its right side, at least 1 millimeter empty space to its front from its front side, at least 1 millimeter empty space to its back from its back side, at least 1 millimeter empty space above it from its top side and at least 1 millimeters empty space below it from its bottom side). In other words, for the motor 30 to have enough room inside the echo chamber 40 to bounce around properly (and make the rattling sound), if the motor was centered (in all directions) inside the hollow interior 41 in the echo chamber 40 there would be at least 1 millimeter of room to move (before a side (or edge) of the motor 30 hits a wall of the echo chamber 40) in all six directions about the motor 30. Each collision of the motor 30 with the echo chamber 40 causes a noise in which continuous collisions cause a rattling sound which can be heard inside the water (and hence fish may surface to investigate). The motion also causes the lure 10 to shake causing ripples in the water which also can attract fish. While the motor moves around inside the hollow interior 41 of the echo chamber 40, the motor nevertheless would not leave the echo chamber 40 as it is surrounded by walls of the echo chamber 40 and the underside 22 of the circuit board. Thus, the motor 30 would bounce freely against all four sides of the echo chamber 40, the bottom (floor) of the echo chamber 40, and the underside 22 of the circuit board (in other words a ceiling of the echo chamber 40). The bouncing motion of the motor is restricted by the four sides of the echo chamber 40, the bottom of the echo chamber, and the ceiling of the echo chamber 40, but not restricted from the attached wires 30, 31 which have ample length to allow the motor 30 to bounce around inside the echo chamber 40. Another way of looking at this is, if L is the length of the motor 30 then the length of the interior 41 of the echo chamber 40 would be at least L+x, if the width of the motor 30 is W then the width of the interior 41 of the echo chamber 41 would be at least W+x, and if H is the height of the motor 30 then the height of the interior 41 of the echo chamber 40 would be at least H+x. The value of x can be 0.5 mm, 1 mm, 2 mm, 5 mm, 1-10 mm, 1-20 mm, 1-30 mm, 1-40 mm, or any number so long as x isn't so big that the motor 30 can't collide with the echo chamber 40 in the length, and/or width, and/or height direction. In the above embodiment, the actual amount of free space in each dimension (height, width, length) can be the same. In another embodiment, the actual amount of free space (difference in size between the echo chamber 40 and the motor 30) in each dimension (height, width, length) can be different (e.g., a lure can have 2 mm free space in the length direction, 3 mm free space in the width direction, and 1 mm free space in the height direction). In an embodiment, the amount of free space in the width dimension should not exceed the width of the motor, the amount of free space in the height dimension should not exceed the height of the motor, and the amount of free space in the length dimension should not exceed the length of the motor, although in another embodiment this may not hold true in some or all dimensions.

While the echo chamber 40 is described and illustrated as being rectangular, it can be appreciated that the echo chamber 40 can be any other shape as well (e.g., circular, ovular, etc.) The size of echo chamber should be structured such that it would enable the motor 30 to move (and bounce) around in all directions (x, y, z) since the size of the motor would be smaller than the echo chamber dimensions.

Figure 6:
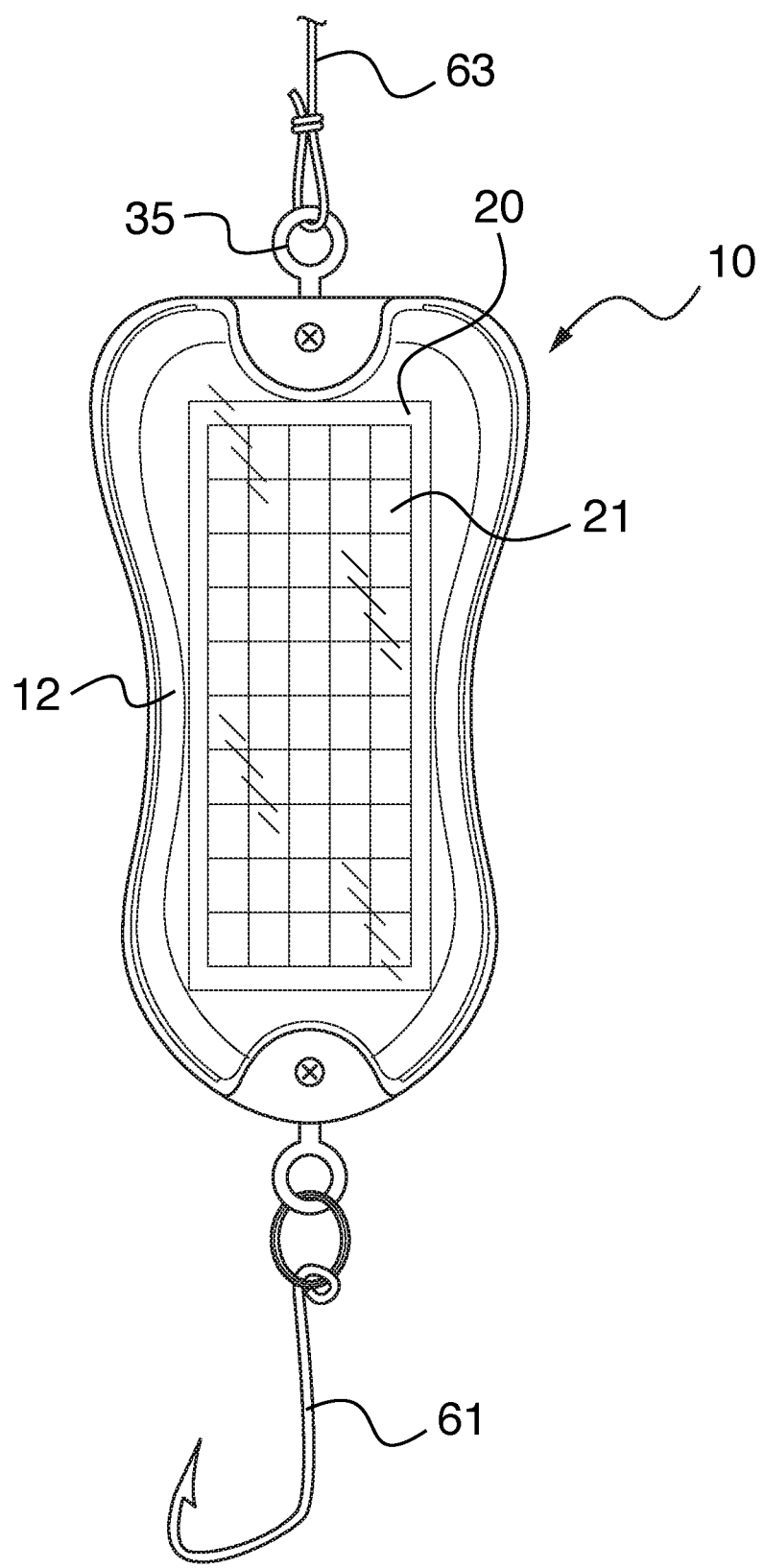
FIG. 6 is a drawing illustrating a fishing line attached to the fishing lure attached to a hook, according to an embodiment.

FIG. 6 is a drawing illustrating a fishing line attached to the fishing lure attached to a hook, according to an embodiment.

A fishing line 63 (connected to a fishing pole) is attached to the lure 10 which is attached to a hook 61 (using a ring such as a split ring connecting the lure 10 to the hook 61). Connectors 35 is integral to the lure 10 and is used to attach to the fishing line 63 and the hook 61. This is how the lure can be utilized in the water to catch fish. Note in another embodiment, the fishing line 63 and the hook 61 can be attached in the opposite configuration shown in FIG. 6 (e.g., the hook 61 attached to the top of the lure and the fishing line 63 attached to the bottom of the lure). Instead of the connects 35, other connects can be utilized as well such as a FIG. 8 loop (of which one end is embedded into the lure 10 and the other end protrudes out of the lure which is used to make a connection to the fishing line 63 and/or hook 61).

Figure 7:
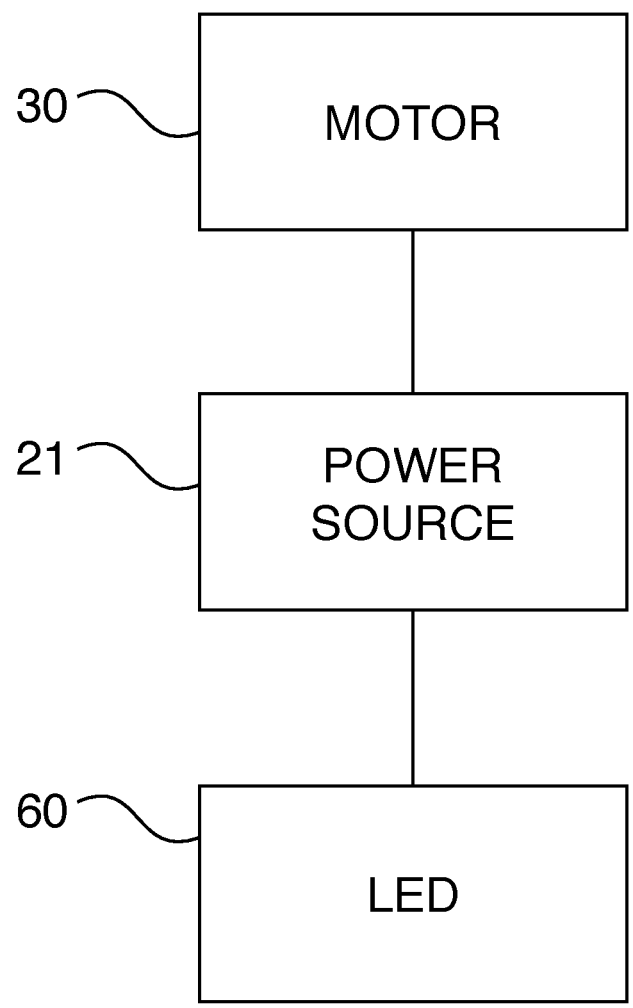
FIG. 7 is a block diagram illustrating electrical components, according to an embodiment.

FIG. 7 is a block diagram illustrating electrical components, according to an embodiment.

A power source (the solar cell array 21) is electrically connected to the motor 30. The power source can also be a battery or any other power source. The power source 21 an also be connected to an optional Light Emitting Diode (LED) 60 which can be configured to flash or emit solid light. The LED can also be used to attract fish.

Figure 8:
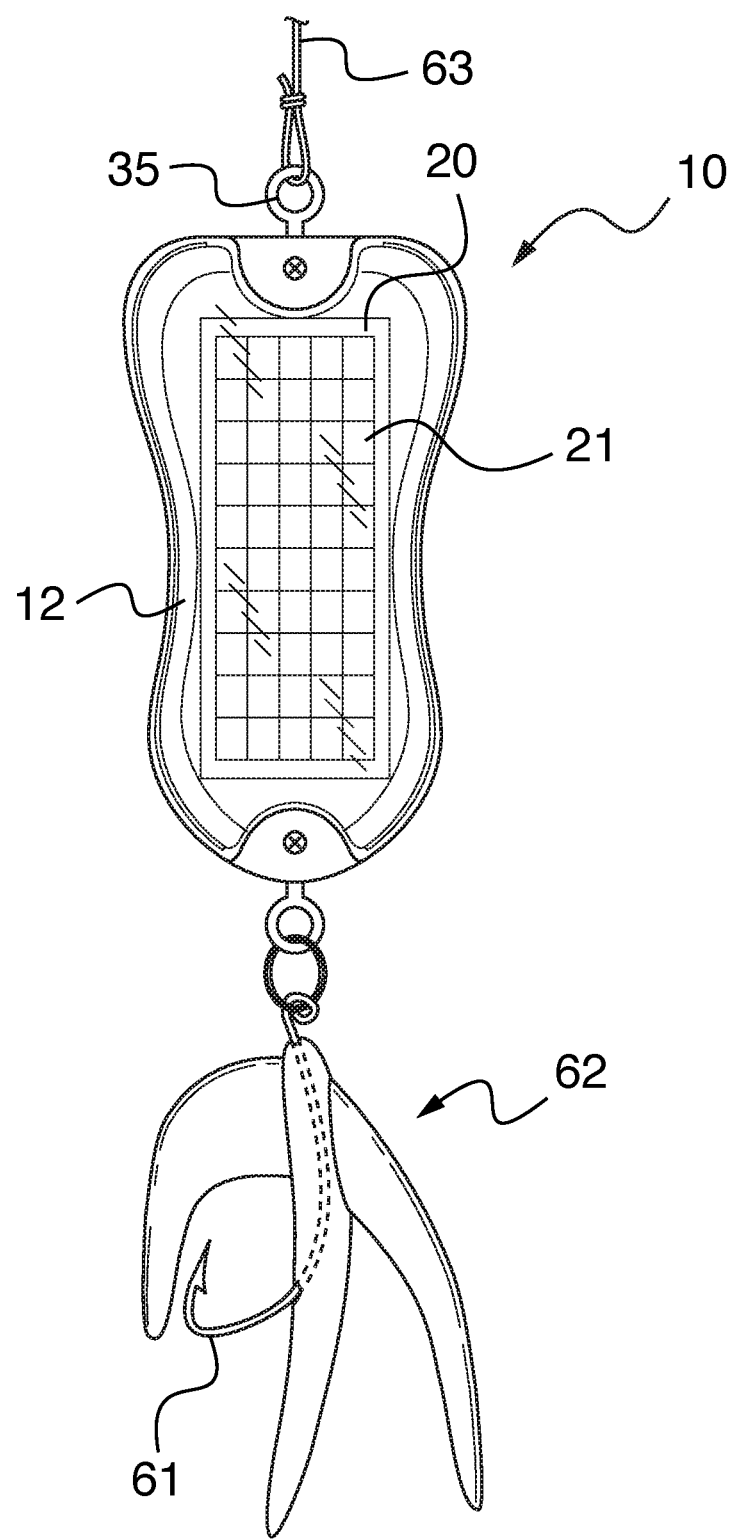
FIG. 8 is a drawing illustrating a fishing line attached to the fishing lure attached to a hook inside fake frog's legs, according to an embodiment.

FIG. 8 is a drawing illustrating a fishing line attached to the fishing lure attached to a hook inside fake frog's legs, according to an embodiment.

The fishing line 63 is attached to the lure 10 which is attached to the hook 61 which is embedded inside a trailer 62 which can also attract fish. The trailer in this case is fake frog's legs 62 (made of plastic or rubber), but other trailers can be used as well (which are imitation animal parts which would attract fish). The rippling effect of the lure would cause the trailer to shake, thereby causing a fish to think a live frog was present.

In a further embodiment, instead of using a solar cell array 21 to power the motor, a standard battery can be used as the power source. The lure 10 can also be scented as well in order to help attract fish. In an embodiment, the material used to make the lure can be infused with scent in order to attract fish. Note that the lure can be made into any shape and/or size and not just that illustrated.

The fishing lure and all of its parts can be made from any suitable materials known in the art for that part, such as (hard or soft) plastic (e.g., marvaloy plastic, NAS polycarbonate plastic, etc.), or other suitable materials. The plastic can be transparent (of course the plastic over the solar panel must be transparent). Glitter can also optionally be added to the plastic material used for the lure 10. The solar panel can be, for example, a 22 mm by 55 mm, 0.5 volts, 220 ma but of course other suitable solar panel can be used. The motor can be an encapsulated water-proof vibration motor, 3-volt, 12,000 rpm but of course other suitable motors can be used as well. The size of the lure approximately 2.75 inches long and 1.5 inches wide, although of course other dimensions can be used as well. The lure can weigh approximately 1 ounce, although of course the lure can be constructed to weigh other amounts as well. The scent can be infused inside hard plastic of the lure 10. The echo chamber can be 31.7 millimeters ("mm") length and 12.7 millimeters wide and 11 millimeters high, the motor can be 25.55 millimeters length and 9.5 millimeters wide and 7 millimeters high, the wires used to attach the motor to the solar panel can be 31 millimeters long, and of course these dimensions are merely examples and other dimensions can of course be used.

Note that scents can also be added to the plastic used to injection mold the lure before the injection molding has begun. Injection molding can be initiated using plastic in the form of pellets. When the pellets are put into a hopper, before the pellets are heated and the injection molding begins, liquid fishing lure scents (which can be purchased off the shelf) is added to the hopper (for example, for every three pounds of pellets, once ounce of scent can be added or any other ratio). The pellets (plastic) and the liquid scent is all mixed together, and so when the pellets are heated and the resultant plastic (from the melted pellets) is injection molded to form the lure, the liquid scent is infused into the plastic, thereby resulting in a strong and lasting scent infused (embedded) into the plastic material used for the lure 10 (and hence the lure 10 itself has an embedded scent). Note that instead of using liquid scent, powered lure scent (in a powder form) can be used as well. Liquid and powdered fishing lure scent can be purchased off the shelf.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A fishing lure apparatus, comprising:
   a casing comprising a transparent top side;
   a circuit board comprising a solar cell array on one side of the circuit board and an underside of the circuit, board opposite the solar cell array;
   an echo chamber inside the casing, the echo chamber having a hollow interior and a surrounding perimeter which contacts a floor of the casing and the underside;
   the solar cell array being located under the transparent top side and mounted over the echo chamber; and
   a motor located in the hollow interior of the echo chamber, the motor electrically connected to the solar cell array,
   wherein the hollow interior of the echo chamber is larger in size than the motor, wherein the motor is not stationarily mounted inside the echo chamber,
   wherein the lure apparatus is configured such that in water the lure would naturally orient itself so that the transparent top side is on top.

2. The apparatus as recited in claim 1, wherein the motor and the echo chamber are configured such that when the motor is energized by the solar cell array, the motor bounces around inside the echo chamber.

3. The apparatus as recited in claim 2, wherein the lure apparatus is further configured such that, when the motor bounces around inside the echo chamber, this causes the lure to vibrate in a water body.

4. The apparatus as recited in claim 2, wherein the lure is further configured such that, when the motor bounces around inside the echo chamber, this causes a rattling sound.

5. The apparatus as recited in claim 3, wherein the lure is further configured such that, when the motor bounces around inside the echo chamber, this causes a rattling sound.

6. The apparatus as recited in claim 1, further comprising an LED inside the casing, the LED electrically connected to the solar array, and the LED configured to flash or light up.

7. The apparatus as recited in claim 1, wherein the casing is waterproof.

8. The apparatus as recited in claim 1, wherein the casing is made from plastic which has a lure scent mixed in with the plastic when the plastic was formed.

9. A method, comprising:
   providing a lure comprising a casing comprising a transparent top side; a circuit board comprising a solar cell array on one side of the circuit board and an underside of the circuit board opposite the solar cell array; an echo chamber inside the casing, the echo chamber having a hollow interior and a surrounding perimeter winch contacts a floor of the casing and the underside; the solar cell array being located under the transparent top side and mounted over the echo chamber; and a motor located in the hollow interior of the echo chamber, the motor electrically connected to the solar cell array, wherein the hollow interior of the echo chamber is larger in size than the motor, wherein the motor is not stationary mounted inside the echo chamber, wherein the lure is configured such that in water the lure would naturally orient itself so that the transparent top side is on top;

placing the casing in water, thereby causing the motor to bounce around inside the echo chamber thereby causing the lure to vibrate in the water.

10. The method as recited in claim 9, wherein the providing further provides an LED inside the casing, the LED electrically connected to the solar cell array, the LED configured to flash or light up.

11. The method as recited in claim 9, wherein the vibrate of the lure in the water causes ripples in the water.

12. The method as recited in claim 9 wherein the vibrate of the lure in the water causes a rattling sound in the water.

13. The method as recited in claim 11, wherein the vibrate of the lure in the water causes a rattling sound in the water.

14. The method as recited in claim 9, further comprising providing a plastic used to form the casing, the plastic having a lure scent mixed with the plastic before the plastic with the lure scent is molded into the lure.

\* \* \* \* \*